United States Patent [19]
Jordan et al.

[11] Patent Number: 5,487,095
[45] Date of Patent: Jan. 23, 1996

[54] EDGE DETECTOR

[75] Inventors: Richard C. Jordan, Lake Katrine; Robert S. Capowski, Verbank; Daniel F. Casper, Poughkeepsie; Frank D. Ferraiolo, New Windsor, all of N.Y.; William C. Laviola, Round Rock, Tex.; Peter R. Tomaszewski, Wake Forest, N.C.

[73] Assignee: International Business Machines Corporation, Armonk, N.Y.

[21] Appl. No.: 262,087

[22] Filed: Jun. 17, 1994

[51] Int. Cl.⁶ ............................................. A04L 7/00
[52] U.S. Cl. ............................................. 376/371; 376/373
[58] Field of Search .................................... 375/118, 119; 307/600, 601, 602

[56] References Cited

U.S. PATENT DOCUMENTS

| | | |
|---|---|---|
| 4,677,648 | 6/1987 | Zurfluh . |
| 4,841,551 | 6/1989 | Avaneas . |
| 4,984,249 | 1/1991 | Long et al. . |
| 5,003,561 | 3/1991 | Dragotin . |
| 5,022,056 | 6/1991 | Henderson et al. . |
| 5,022,057 | 6/1991 | Nishi et al. . |
| 5,095,498 | 3/1992 | DeLuca et al. . |
| 5,313,501 | 5/1994 | Thacker ................................. 375/118 |

*Primary Examiner*—Stephen Chin
*Assistant Examiner*—Huong Luu
*Attorney, Agent, or Firm*—Laurence J. Marhoefer; Lynn L. Augspurger

[57] ABSTRACT

An edge detector has a digital phase locking loop in which one of the signals (e.g., the data signal) is coupled to a delay chain that develops a series of incrementally phase delayed versions of the input. Adjacent phase delayed pairs are selected, one pair at a time, and are compared to the other signal (e.g., the clock signal) to determine if an edge of the clock falls between the edges of the data signal in the selected phase pair, or falls outside the edges of the selected phase pair, on one side or the other thereof. If the clock edge falls outside the selected pair, a control signal selects another pair for comparison and the process is repeated until, for example, the data edges are aligned with the positive going edge of the clock. With a clock frequency equal to twice data frequency, the data can then be sampled on the falling edge of the clock.

6 Claims, 4 Drawing Sheets

EDGE DETECTOR

CROSS REFERENCE TO RELATED APPLICATIONS

The present United States patent application is related to the following co-pending United States patent applications incorporated herein by reference:

Application Ser. No. 08/261,515, filed Jun. 17, 1994, entitled "Self-Timed Interface," and assigned to the assignee of this application.

Application Ser. No. 08/261,522, filed Jun. 17, 1994, entitled "Multiple Processor Link," and assigned to the assignee of this application.

Application Ser. No. 08/261,561, filed Jun. 17, 1994, entitled "Enhanced Input-Output Element," and assigned to the assignee of this application.

Application Ser. No. 08/261,603, filed Jun. 17, 1994, entitled "Massively Parallel System," and assigned to the assignee of this application.

Application Ser. No. 08/261,523, filed Jun. 17, 1994, entitled "Attached Storage Media Link," and assigned to the assignee of this application.

Application Ser. No. 08/261,641, filed Jun. 17, 1994, entitled "Shared Channel Subsystem," and assigned to the assignee of this application.

BACKGROUND OF THE INVENTION

1. Field of the Invention

This invention relates to an improved method and system for acquiring and maintaining phase synchronism between two digital signals (i.e., a data signal and a clock signal), and more particularly, to a system that can be economically implemented in very large scale integrated circuits.

2. Description of the Prior Art

Digital phase locked loops are known and used in the prior art to acquire and maintain phase synchronization between a digital data signal and a digital clock signal. Typically, in a digital phase locked loop, input data is delayed by incremental fixed time intervals to generate multiple phases of the data signal. These phases are individually sampled and compared with the digital clock signal. In making this comparison, a circuit detects a phase difference between the clock signal and each of the multiple phases of the data signal. The comparison circuit generates a control signal that selects one of the multiple phases best suited to be sampled by the clock signal. In such prior art digital phase locked loops, each delay element is sampled and individually compared with the clock signal. In general, performance of the loop is proportional to the number of delay elements or taps and a large amount of circuitry is required to make the comparisons and to generate a control signal. Then, too, in prior art systems, filtering significantly increases the number of circuits since each element must be individually sampled, interrogated, and stored.

SUMMARY OF THE INVENTION

One object of the invention is the provision of a digital phase locked loop that significantly reduces circuit count.

Another object of this invention is the provision of a loop algorithm where the comparator output is in the form of a lead/lag signal that can be easily filtered.

A still further object of the invention is the provision of a digital phase locked loop in which the data and clock can operate at the same frequency.

Briefly, this invention contemplates the provision of a digital phase locking loop in which one of the signals (e.g., the data signal) is coupled to a delay chain that develops a series of incrementally phase delayed versions of the input. Adjacent phase delayed pairs are selected, one pair at a time, and are compared to the other signal (e.g., the clock signal) to determine if an edge of the clock falls between the edges of the data signal in the selected phase pair, or falls outside the edges of the selected phase pair, on one side or the other thereof. If the clock edge falls outside the selected pair, a control signal selects another pair for comparison and the process is repeated until, for example, the data edges are aligned with the positive going edge of the clock. With a clock frequency equal to twice data frequency, the data can then be sampled on the falling edge of the clock. In a preferred embodiment of the invention, the leading and trailing edges of the data signal are each aligned with the leading and trailing edges of the clock signal. Here, the data can be sampled at the midpoint between the data edges and a clock running at the same frequency as the data can be used.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
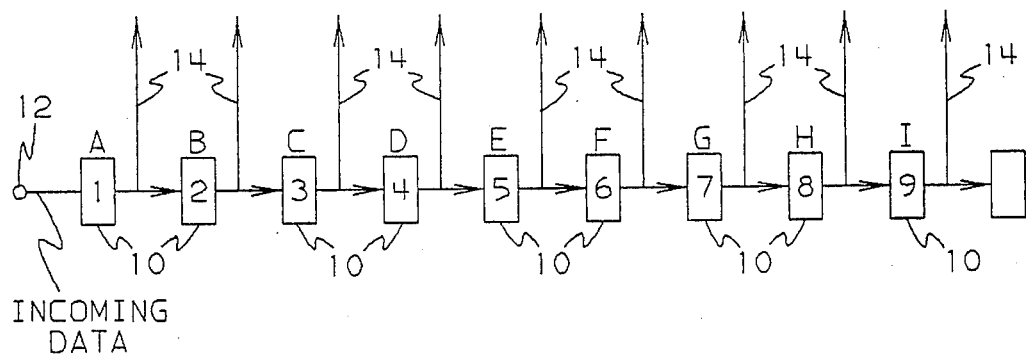
FIG. 1A is a schematic diagram of a digital delay line useful in explaining the invention.
Figure 1B:
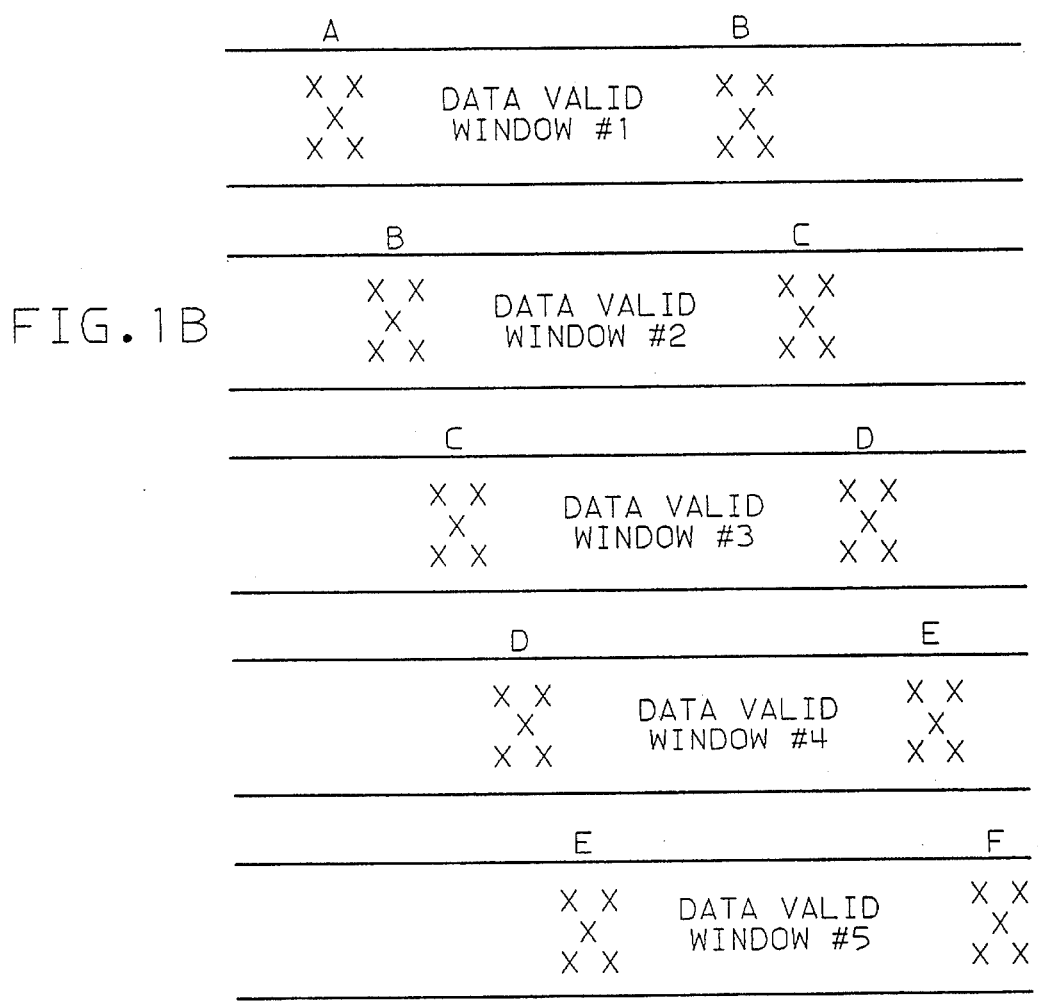
FIG. 1B is a pictorial diagram of a series of validation windows generated by the delay line of FIG. 1A.

Referring now to FIG. 1A, a digital delay line, comprised of delay elements 10, generates multiple phase of an incoming data stream coupled to terminal 12. The multiple phases of the incoming data stream can be accessed via taps 14. At each tap, the phase of the incoming data is delayed an incremental amount with respect to the preceding tap, so that between adjacent taps, such as tap pairs A-B, B-C, C-D, D-E, E-F, etc. As shown in FIG. 1B, each tap pair generates a validation window (e.g. windows 1–5) between incrementally delayed edges of the data stream.

Figure 2:
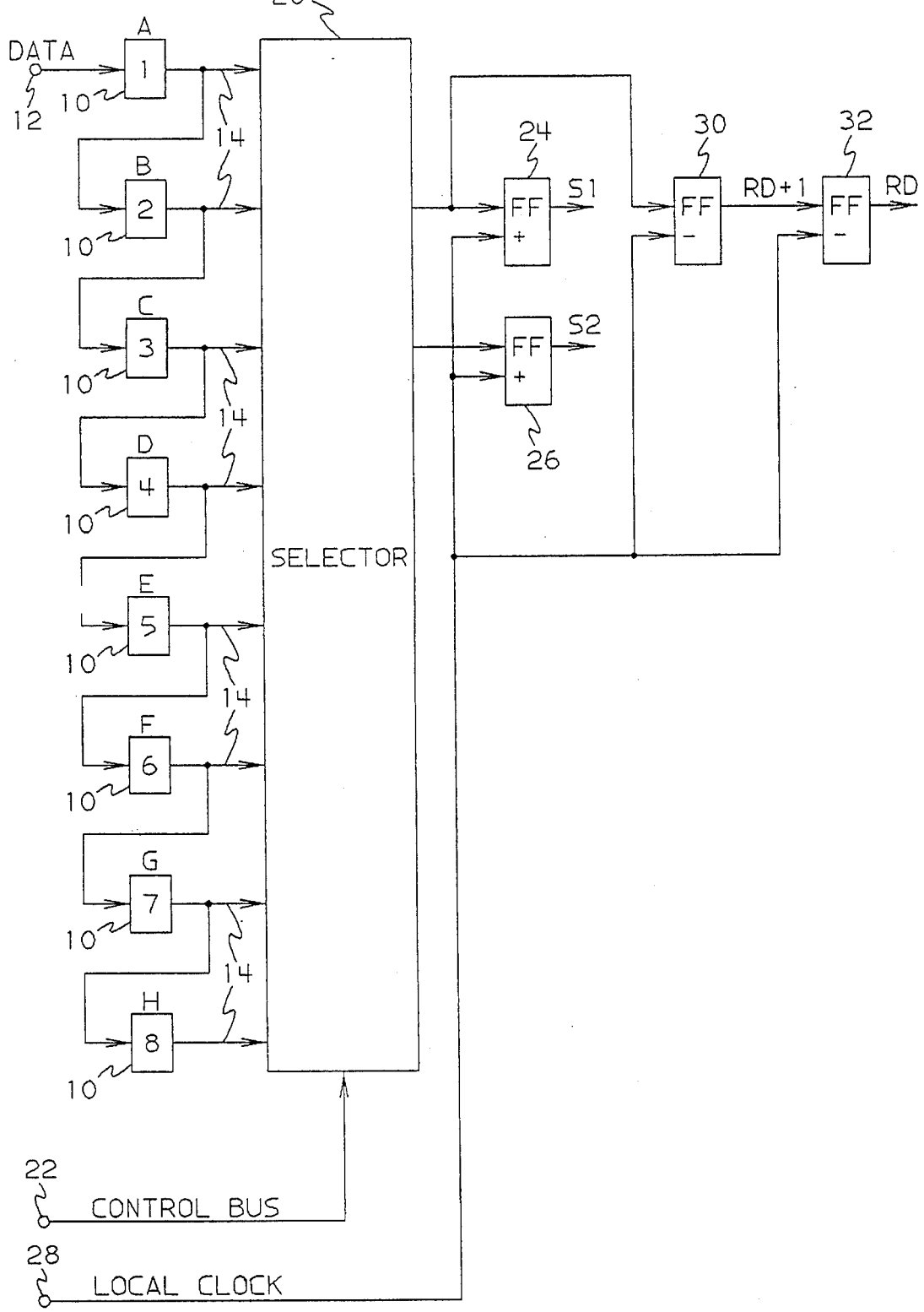
FIG. 2 is a schematic diagram illustrating one embodiment of a phase pair selection control logic in accordance with the teachings of this invention.

Referring now to FIG. 2, in this exemplary embodiment of the invention, the clock frequency is twice the frequency of the incoming data frequency and the data is to be aligned with the positive going edge of the clock. The data is sampled on the falling edge of the clock, i.e., at the center of a data cell. The delay line taps 14 are coupled as inputs to a selector 20 which, in response to a "lag," "lead," or "do nothing" control signal input to terminal 22, selects a pair of taps, one pair at a time, for comparison with the clock signal.

The samples from a pair of adjacent taps 14 (e.g. taps B and C) are clocked into flip-flops 24 and 26, respectively, on (for example) positive going edges of a clock signal coupled to terminal 28. The clock signal may be either a transmitted clock disclosed in co-pending application Ser. No. 08/261, 515, filed Jun. 17, 1994, and assigned to the assignee of this application. Alternatively, it may be a locally generated clock. The state of the phase sample at the time of the clock edge appears at the outputs S1 and S2 of the flip-flops 24 and 26.

The first data phase sample (e.g., phase B) is also sampled on the negative going edge of the local clock and the result clocked into flip-flop 30. The state of the first phase at the negative edge of the clock appears at the output of flip-flop 30, termed regenerated data +1 (RD+1). The state of flip-flop 30 is also clocked into a flip-flop 32 on the negative edge of the clock. The state of flip-flop 30 at the negative clock edge is termed the regenerated data (RD) and appears at the output of flip-flop 32.

Figure 3:
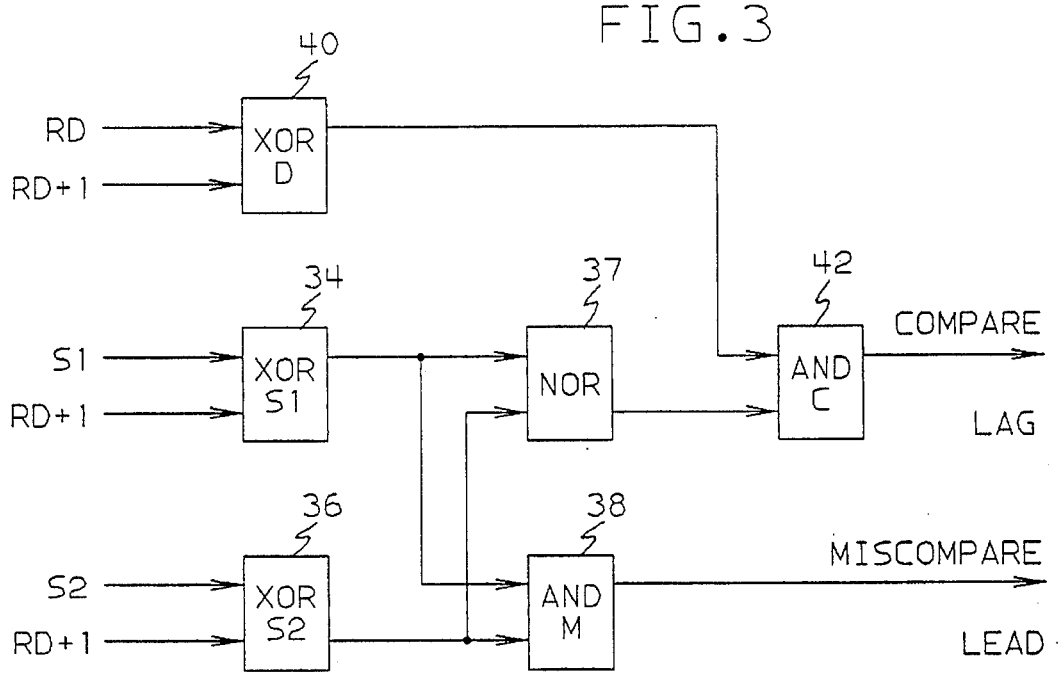
FIG. 3 is a schematic diagram illustrating one embodiment of a phase detector in accordance with the teachings of this invention.
Figure 4A:
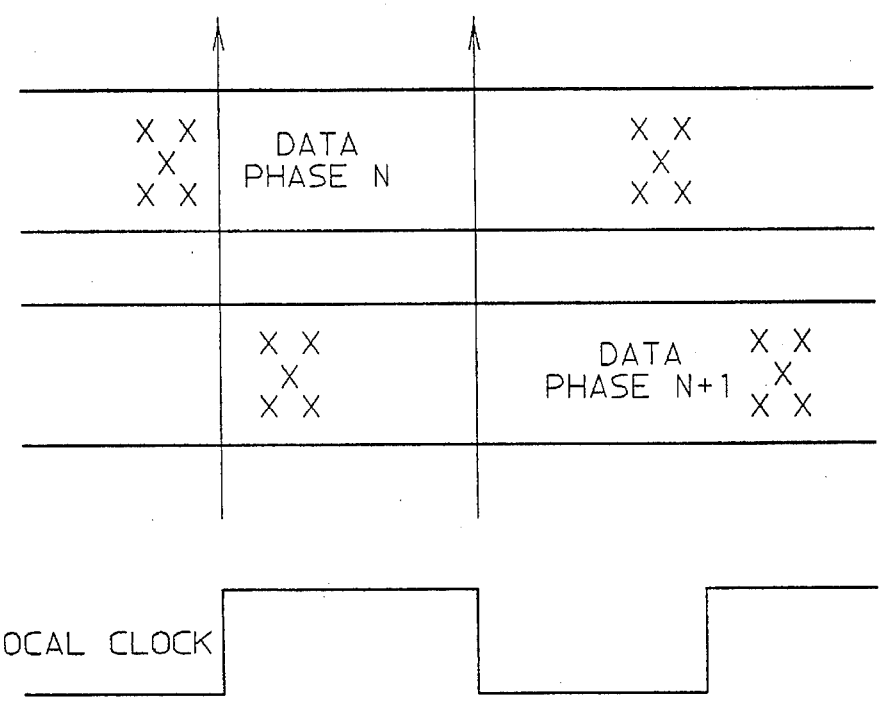
FIGS. 4A, 4B and 4C illustrate three possible locations of the clock edge relative to a select pair of delayed data edges.
Figure 4B:
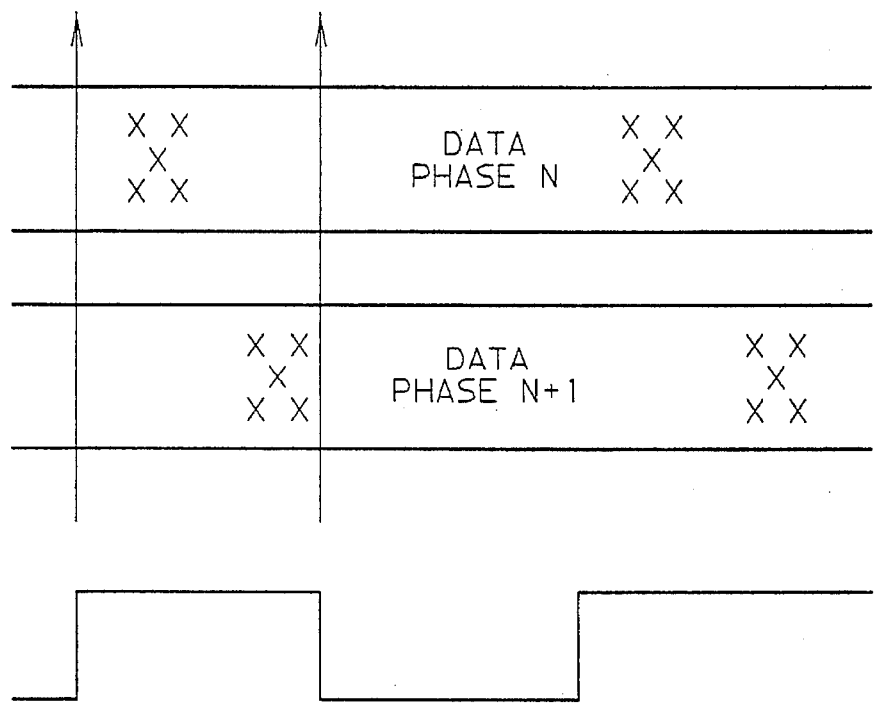
Figure 4C:
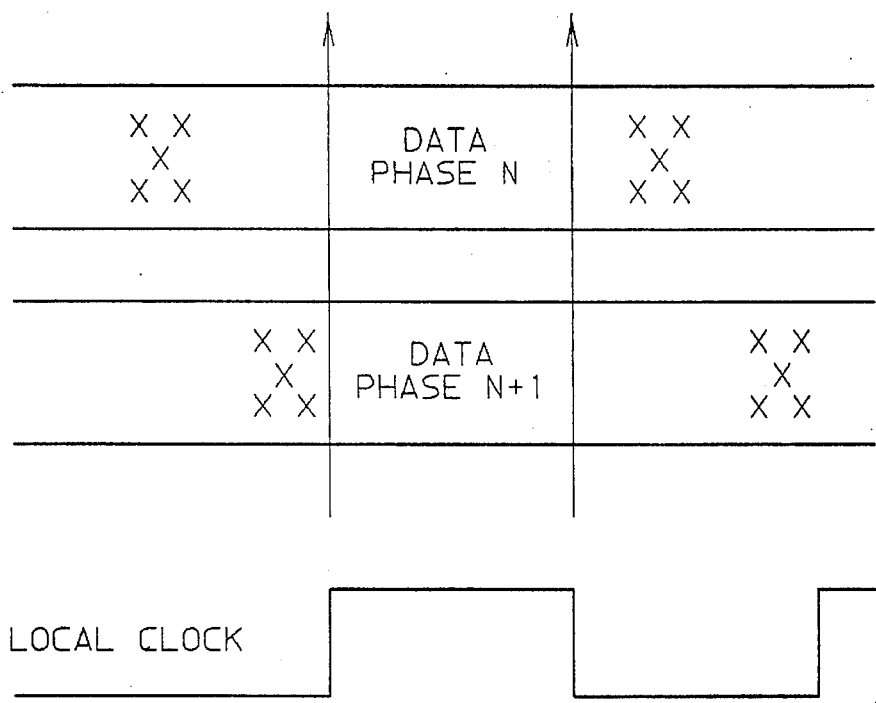

Referring now to FIG. 3, Exclusive OR gates 34 and 36 compare the state S1 and S2, respectively, of the phase signals with the regenerated data signal RD+1. As illustrated in FIGS. 4A, 4B and 4C, three possible relationships exist.

If one of the phase samples compares with the regenerated data and the other miscompares, then an edge has occurred between the two phase samples. This is the desired operating condition (FIG. 4A). NOR gate 37 miscompares and NO signal is outputted from the phase detector for this case.

If both samples miscompare with respect to the regenerated data sample, then an edge on data must have occurred between the two samples and regenerated data. This will cause both exclusive OR gates (XOR-S1 and XOR-S2) to have a logic one and an AND-M 38 gate to have a logic one, hence a "lead" signal will be outputted from the phase detector. The data and clock relationship for this case is shown in FIG. 4B.

If both samples compare with regenerated data, then there are two possible cases. These two cases can be differentiated by comparing the present value of regenerated data RD+1 to the previous value of regenerated data RD. If a transition did occur, then the present value of regenerated data will miscompare with the previous value of regenerated data.

An exclusive OR gate 40 (XOR-D) makes this comparison between RD and RD+1. If there were two consecutive bits of the same logic level on the incoming data stream, there is no edge information, so no phase detector output signal is generated. The NOR logic gate 37 output is inhibited by an AND-C gate 42 prior to the compare output. If the regenerated data did have a transition, (XOR-D gate 40 output equals one) the samples are too close to the center of the bit. A "lag" signal is outputted from gate 42 of the phase detector for this case. The data and clock relationship for this case is shown in FIG. 4C.

Note that this phase detector with a small number of input signals (4) produces the desired phase relationship and control signal. Using this phase detector, larger numbers of data samples (phases) can be easily handled. This improves performance (allows smaller phase increments), without adding an excessive amount of circuitry. The phase detector output signal can be easily filtered and does not require several accumulators and an analyzer or a processor in order to average the clock data phase relationship. This allows better filtering with much fewer circuits. The phase detector also significantly reduces the number of loads the clock must drive, this improves performance by minimizing clock loading/distortion.

While the invention has been described in terms of a single preferred embodiment, those skilled in the art will recognize that the invention can be practiced with modification within the spirit and scope of the appended claims. For example, for clarity, the invention has been described and claimed in terms of delaying the data signal with respect to the clock signal in order to generate phase pairs. Those skilled in the art will recognize that the clock can be delayed to generate phase pairs and that clock signal and data signal are convenient, but interchangeable, identifiers.

Having thus described our invention, what we claim as new and desire to secure by Letters Patent is as follows:

1. A method for locating a transition in a digital stream with respect to a transition in a clock signal, comprising the steps of:

generating at least three phase shifted versions of said digital data stream;

selecting a first pair of two adjacent phase shifted versions of said digital data stream from said at least three phase shifted versions of said digital data stream;

comparing said first pair of two adjacent phase shifted versions of said digital data stream with said clock signal to determine whether or not a transition of said clock signal falls between transitions of said first pair of two adjacent phase shifted versions of said digital data stream;

selecting a second pair of two adjacent phase shifted versions of said digital data stream from said at least three phase shifted versions of said digital data stream if said comparing step for said first pair of two adjacent phase shifted versions of said digital data stream determines that said clock signal does not fall between transitions of said first pair of two adjacent phase shifted versions of said digital data stream;

repeating said comparing step for said second pair of two adjacent phase shifted versions of said digital data stream; and repeating said selecting and comparing steps for other pairs of two adjacent phase shifted versions of said digital data stream until a determination is made that said clock signal falls between transitions of a pair of two adjacent phase shifted versions of said digital data stream.

2. In a system for synchronizing a phase of a clock signal with a phase of a digital data stream, an edge detector for locating an edge of a digital data cell with respect to an edge of the clock signal, comprising in combination:

means for phase shifting said digital data stream to generate a series of phase shifted versions of said digital data stream, each phase shifted version in said series being shifted an incremental amount with respect to preceding versions in said series, said series having N phase shifted versions of said digital data stream where N is a number greater than two;

means to sequentially select pairs of two adjacent phase shifted versions in said series of phase shifted versions of said digital data stream; and means to compare a state of said clock signal and said two adjacent phase shifted versions of said digital data stream in order determine if a transition in said clock signal occurs between two adjacent transitions of a selected pair of said two adjacent phase shifted versions of said series of phase shifted versions of said digital data stream or to one side or the other of said two adjacent transitions.

3. In a system for synchronizing a phase of a clock signal with a phase of a digital data stream, an edge detector as in claim 2 wherein said means to compare controls said means to sequentially select.

4. In a system for synchronizing a phase of a clock signal with a phase of a digital data stream, an edge detector as in claim 3 wherein said means to compare generates lag, lead or do nothing commands to said means to sequentially select depending respectively if said clock signal transition occurs on one side or the other side or between said two adjacent transitions.

5. In a system for synchronizing a phase of a clock signal with a phase of a digital data stream, an edge detector as in claim 2, wherein said clock signal operates at a clock signal operating frequency and said digital data stream operates at a digital data stream frequency and the clock signal operating frequency is twice the digital data stream operating frequency.

6. In a system for synchronizing a phase of a clock signal with a phase of a digital data stream, an edge detector as in claim 2, wherein said clock signal operates at a clock signal operating frequency and said digital data stream operates at a digital data stream frequency and the clock signal operating frequency is equal to the digital data stream operating frequency.

* * * * *